United States Patent
Ryan

(10) Patent No.: US 9,563,785 B2
(45) Date of Patent: Feb. 7, 2017

(54) OPTIMIZED ENCRYPTION FILTERING OF FILES

(71) Applicant: VMware, Inc., Palo Alto, CA (US)

(72) Inventor: Nicholas Michael Ryan, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/558,917

(22) Filed: Dec. 3, 2014

(65) Prior Publication Data

US 2016/0162699 A1  Jun. 9, 2016

(51) Int. Cl.
*G06F 21/62* (2013.01)
*G06F 21/78* (2013.01)
*G06F 17/00* (2006.01)
*H04L 9/00* (2006.01)

(52) U.S. Cl.
CPC ........... *G06F 21/6218* (2013.01); *G06F 17/00* (2013.01); *G06F 21/78* (2013.01); *H04L 9/00* (2013.01); *G06F 2221/2107* (2013.01)

(58) Field of Classification Search
CPC .. G06F 21/6209; G06F 21/6218; G06F 21/78; G06F 2221/2107
See application file for complete search history.

(56) References Cited

U.S. PATENT DOCUMENTS

| | | | |
|---|---|---|---|
| 7,428,636 B1* | 9/2008 | Waldspurger | H04L 63/083 713/164 |
| 8,117,464 B1* | 2/2012 | Kogelnik | H04L 63/0428 380/284 |
| 2007/0174909 A1* | 7/2007 | Burchett | G06F 21/602 726/18 |

OTHER PUBLICATIONS

Halcrow, eCryptfs—A Stacked Cryptographic Filesystem, 2007.*

* cited by examiner

*Primary Examiner* — Minh Dinh

(57) ABSTRACT

Read data blocks are selectively decrypted and write data bocks are selectively encrypted in an input-output path between an application and a file system driver. If a read data block contains all zeroes, the read data block is not decrypted even though the read data block is a block of an encrypted file. Likewise, if a write data block contains all zeroes, the write data block is not encrypted even though the write data block is a block of an encrypted file. In this manner, the handling of zero blocks of an encrypted file is efficiently processed outside the file system without relying on bitmaps or other data structure maintained by the file system that may inform which blocks contain all zeroes.

16 Claims, 7 Drawing Sheets

OPTIMIZED ENCRYPTION FILTERING OF FILES

BACKGROUND

File systems may use encryption to protect data written to storage devices. Data is written to storage devices in encrypted form so that the raw data stored in the storage devices is unrecognizable. With this protection mechanism, access to the storage device alone is not enough to read the data stored in the storage device. Before the data can be recognizable and usable, the data has to be first decrypted with a proper key.

The encryption functionality may be provided using an encryption filter that is external to the file system. Specifically, the encryption filter is placed in the IO (input-output operation) path between an application issuing the IO and the file system driver. When write IOs targeting encrypted files are issued, the write data are encrypted before the file system driver processes the write IOs. When read IOs targeting encrypted files are issued, data are read in encrypted form from the storage device and decrypted before they are returned as read data.

To track files that have been designated for encryption, a filter driver is employed. The filter driver lies in the IO path between the application issuing the IO and the encryption filter. If a file targeted in a write IO is designated for encryption, the filter driver employs the encryption filter to encrypt the write data. Similarly, if a file targeted in a read IO is designated for encryption, the filter driver employs the encryption filter to decrypt the data read from the storage device before returning the data to the application as read data.

A file that is known to contain all zeros may be designated for no encryption because the encryption filter would consume processing resources unnecessarily because zeroes do not need to be protected. For sparse files, the same is true for file blocks that have yet to be allocated. However, when the encryption functionality is implemented using an encryption filter and associated filter driver, which are external to the file system, it is difficult to implement the optimization for file blocks of sparse files with zeroes because a file allocation bitmap that indicates which file blocks contain zeroes is maintained by the file system and is not readily available outside the file system.

DETAILED DESCRIPTION

According to embodiments, read data blocks are selectively decrypted and write data bocks are selectively encrypted in an IO path between an application and a file system driver. If a read data block contains all zeroes, the read data block is not decrypted even though the read data block is a block of an encrypted file. Likewise, if a write data block contains all zeroes, the write data block is not encrypted even though the write data block is a block of an encrypted file. In this manner, the handling of zero blocks of an encrypted file is efficiently processed outside the file system without relying on bitmaps or other data structure maintained by the file system that may inform which blocks contain all zeroes.

Figure 1:
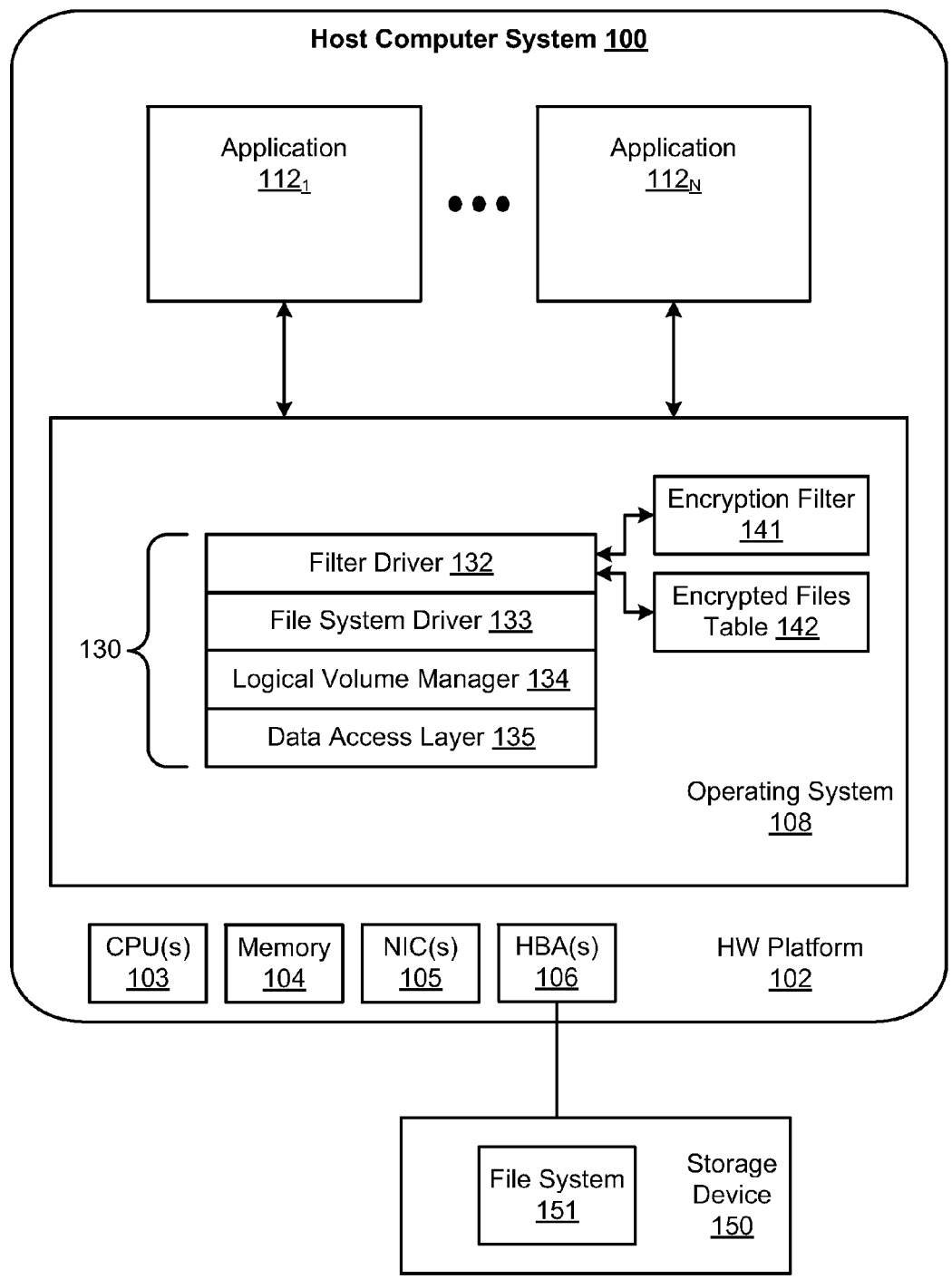
FIG. 1 is a computer system having an operating system that employs a filter driver that is external to a file system driver of the operating system to provide an encrypted storage system.

FIG. 1 is a computer system, shown as host computer system 100, having an operating system 108 that employs an encryption filter 141 that is external to a file system driver 133 of the operating system to provide an encrypted storage system. In one embodiment, encryption filter 141 employs an encryption algorithm to generate ciphertext. Host computer system 100 may be constructed on a conventional, typically server-class, hardware platform 102, and includes one or more central processing units (CPUs) 103, system memory 104, one or more network interface controllers (NICs) 105 that connect host computer 100 to a network, and one or more host bus adapters (HBAs) 106 that connect host computer 102 to a persistent storage unit, illustrated herein as storage device 150. Alternatively, persistent storage may be provided locally in host computer 100 or through the network by a networked-attached storage device.

As further shown in FIG. 1, operating system 108 is installed on top of hardware platform 102 and supports the execution of applications $112_1$-$112_N$. IOs issued by the applications are processed through IO stack 130 of operating system 108. At the top of IO stack 130 is a filter driver 132 which examines read IOs and write IOs issued by applications 112 and intercepts read/write data for processing in encryption filter 141 if the IO targets an encrypted file, i.e., one of the files identified in encrypted files table 142. The process of intercepting the read/write data is described below in conjunction with FIGS. 4 and 5.

The remaining layers of IO stack 130 are additional layers managed by operating system 108. File system driver 133 receives the read IOs and write IOs passed through filter driver 132 and translates them to block IOs issued to one or more logical volumes that are provisioned in file system 151. These block IOs are processed by logical volume manager (LVM) 134, which generates raw SCSI commands from the block IOs and provides them to data access layer 135. Data access layer 135 includes a device access layer, which discovers storage device 150, and applies command queuing and scheduling policies to the raw SCSI commands, and a device driver, which understands the input/output interface of HBAs 106 interfacing with storage device 150, and sends the raw SCSI commands to HBAs 106 to be forwarded to storage device 150.

Figure 2:
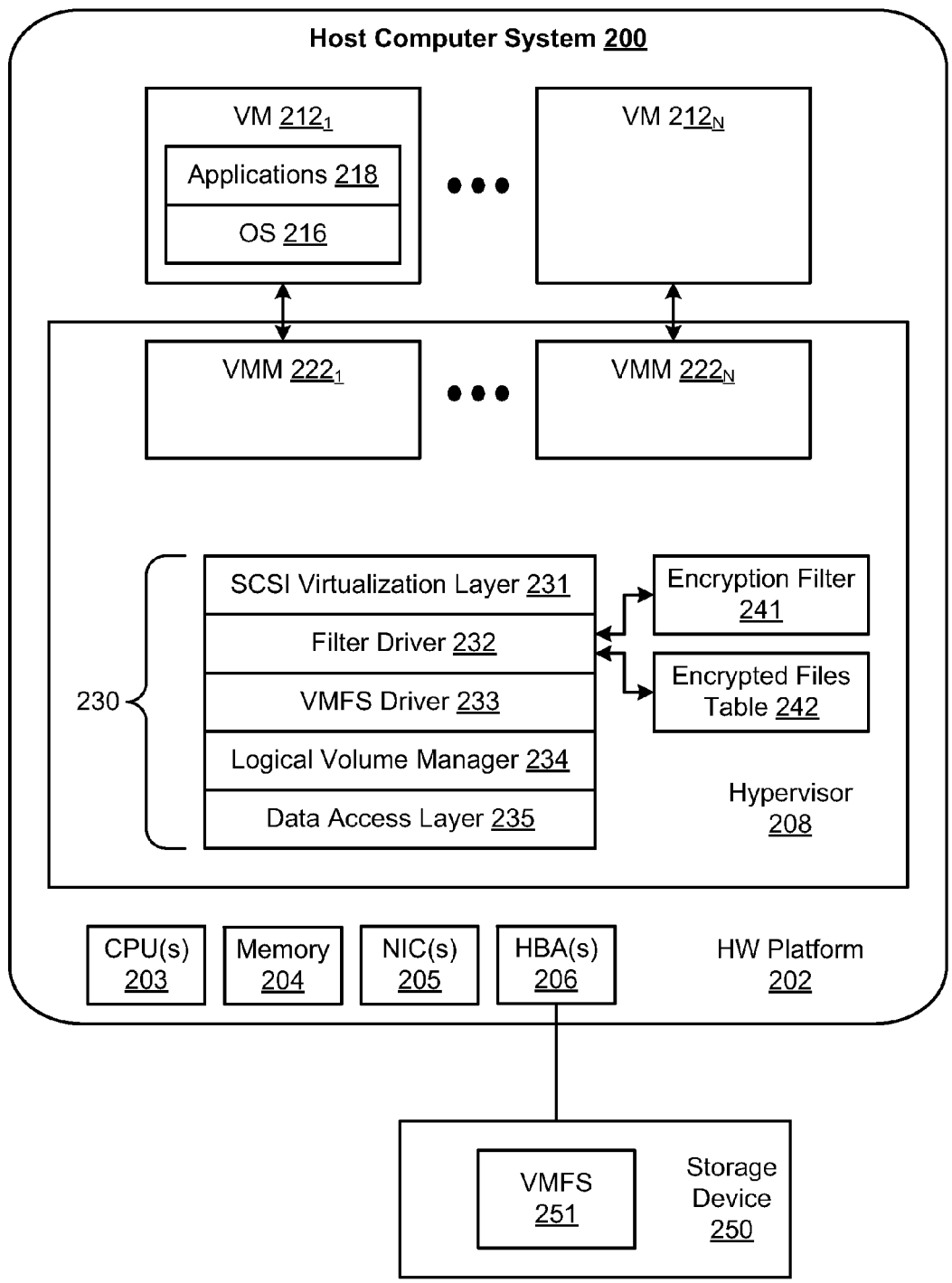
FIG. 2 is a computer system having a hypervisor that employs a filter driver that is external to a file system driver of the hypervisor to provide an encrypted storage system.

FIG. 2 is a computer system, shown as host computer system 200, having a hypervisor 208 that employs a filter driver 232 that is external to a file system driver of the hypervisor (e.g., virtual machine file system (VMFS) driver 233) to provide an encrypted storage system. Host computer system 200 may be constructed on a conventional, typically server-class, hardware platform 202, and includes one or more central processing units (CPUs) 203, system memory 204, one or more network interface controllers (NICs) 205 that connect host computer 200 to a network, and one or more host bus adapters (HBAs) 206 that connect host computer 202 to a persistent storage unit, illustrated herein as storage device 250. Alternatively, persistent storage may be provided locally in host computer 200 or through the network by a networked-attached storage device.

As further shown in FIG. 2, hypervisor 208 is installed on top of hardware platform 202 and supports the execution of virtual machines (VMs) $212_1$-$212_N$ through corresponding virtual machine monitors (VMMs) $222_1$-$222_N$. Each such VM 212 implements a virtual hardware platform in the corresponding VMM 222 that supports the installation of a guest operating system (OS) which is capable of executing applications. In the example illustrated in FIG. 2, the virtual hardware platform for VM $212_1$ supports the installation of a guest OS 216 which is capable of executing applications 218 within VM $212_1$. Guest OS 216 may be any of the well-known commodity operating systems, such as Microsoft Windows®, Linux®, and the like, and includes a native file system layer, for example, either an NTFS or an ext3FS type file system layer. IOs issued by guest OS 216 through the native file system layer appear to guest OS 216 as being routed to one or more virtual disks provisioned for VM $212_1$ for final execution, but such IOs are, in reality, reprocessed by IO stack 230 of hypervisor 208 and the reprocessed IOs are issued through HBA 206 to storage device 250.

At the top of IO stack 230 is a SCSI virtualization layer 231, which receives IOs directed at the issuing VM's virtual disk and translates them into IOs directed at one or more files managed by hypervisor 208, e.g., virtual disk files representing the issuing VM's virtual disk. Filter driver 232 examines the translated IOs from SCSI virtualization layer 231 and intercepts read/write data for processing in encryption filter 241 if the IO targets an encrypted file, i.e., one of the files identified in encrypted files table 242. The process of intercepting the read/write data is described below in conjunction with FIGS. 4 and 5.

The remaining layers of IO stack 230 are additional layers managed by hypervisor 208. VMFS driver 233 receives the IOs passed through filter driver 232 and translates them to block IOs issued to one or more logical volumes that are provisioned in VMFS 251. These block IOs are processed by logical volume manager (LVM) 234, which generates raw SCSI commands from the block IOs and provides them to data access layer 235. Data access layer 235 includes a device access layer, which discovers storage device 250, and applies command queuing and scheduling policies to the raw SCSI commands, and a device driver, which understands the input/output interface of HBAs 206 interfacing with storage device 250, and sends the raw SCSI commands to HBAs 206 to be forwarded to storage device 250.

It should be recognized that the various terms, layers and categorizations used to describe the virtualization components in FIG. 2 may be referred to differently without departing from their functionality or the spirit or scope of the invention. For example, VMMs 222 may be considered separate virtualization components between VMs 212 and hypervisor 208 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Embodiments provide optimized encryption techniques when a file contains one or more zero blocks. As such, when the optimized encryption techniques are applied to sparse files, such as virtual disk files that function as virtual disks for virtual machines, the optimized encryption techniques according to the embodiments yield greater performance gains.

In the embodiments, even when encryption is employed, blocks containing all zeroes are recognized as zero blocks, relying on statistics that encryption of non-zero blocks will not result in all zeroes. More specifically, most modern day file systems employ a block size of at least 512 bytes. The chance of a non-zero block of 512 bytes being encrypted to all zeroes is on the order of 1 in 2 to the power of 4096, a statistical improbability.

Figure 3A:
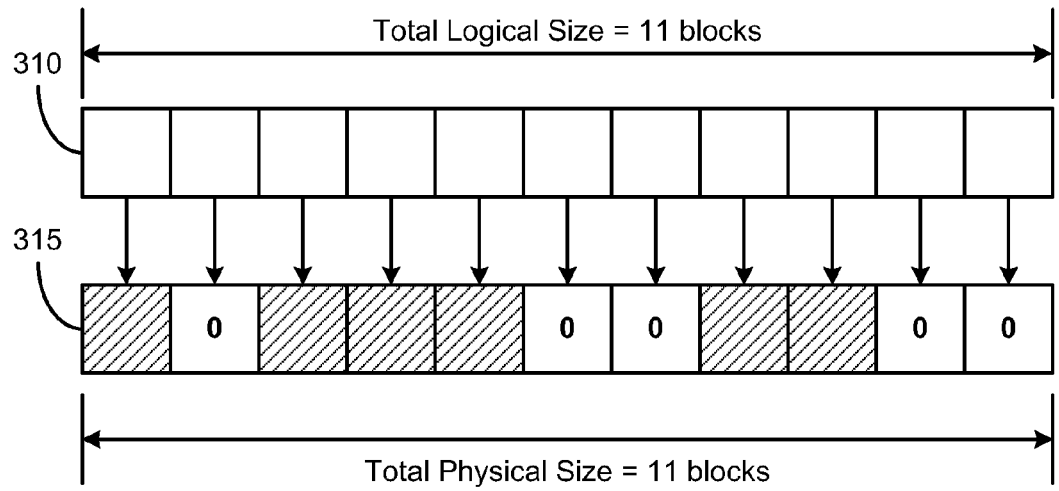
FIGS. 3A and 3B are conceptual diagrams that illustrate a difference between non-sparse files and sparse files.
Figure 3B:
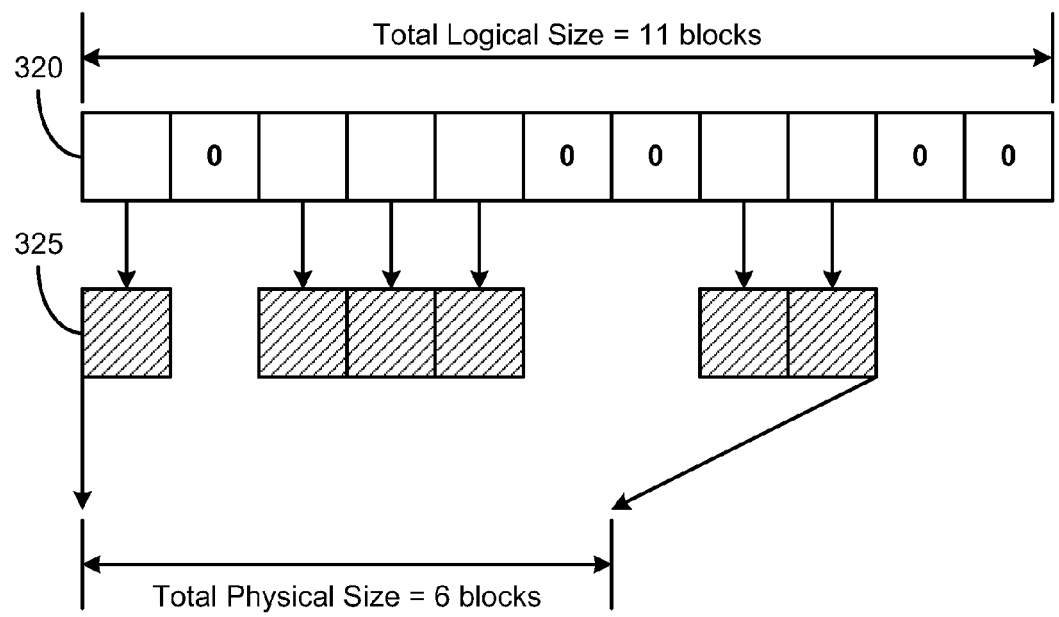

FIGS. 3A and 3B are conceptual diagrams that illustrate a difference between non-sparse files and sparse files. FIG. 3A illustrates a file metadata 310 for a file that has a logical size of 11 blocks, of which 5 of them are zero blocks. File metadata 310 describes a non-sparse file and thus contains pointers to blocks 315 in storage for each of the 11 blocks of the file including non-zero blocks and zero blocks, such that the file also has a total physical size of 11 blocks. FIG. 3B illustrates a file metadata 320 for the same file, which has a logical size of 11 blocks, of which 5 of them are zero blocks. File metadata 320 describes a sparse file and contains pointers to blocks 325 in storage for only the non-zero blocks of the file. The zero blocks of the file are tracked in file metadata 320 but do no occupy any blocks in storage. As a result, the total physical size of blocks in storage occupied by the sparse file is 6 blocks, as shown in FIG. 3B, whereas the total physical size of blocks in storage occupied by the non-sparse file is 11 blocks, as shown in FIG. 3A.

Figure 4:
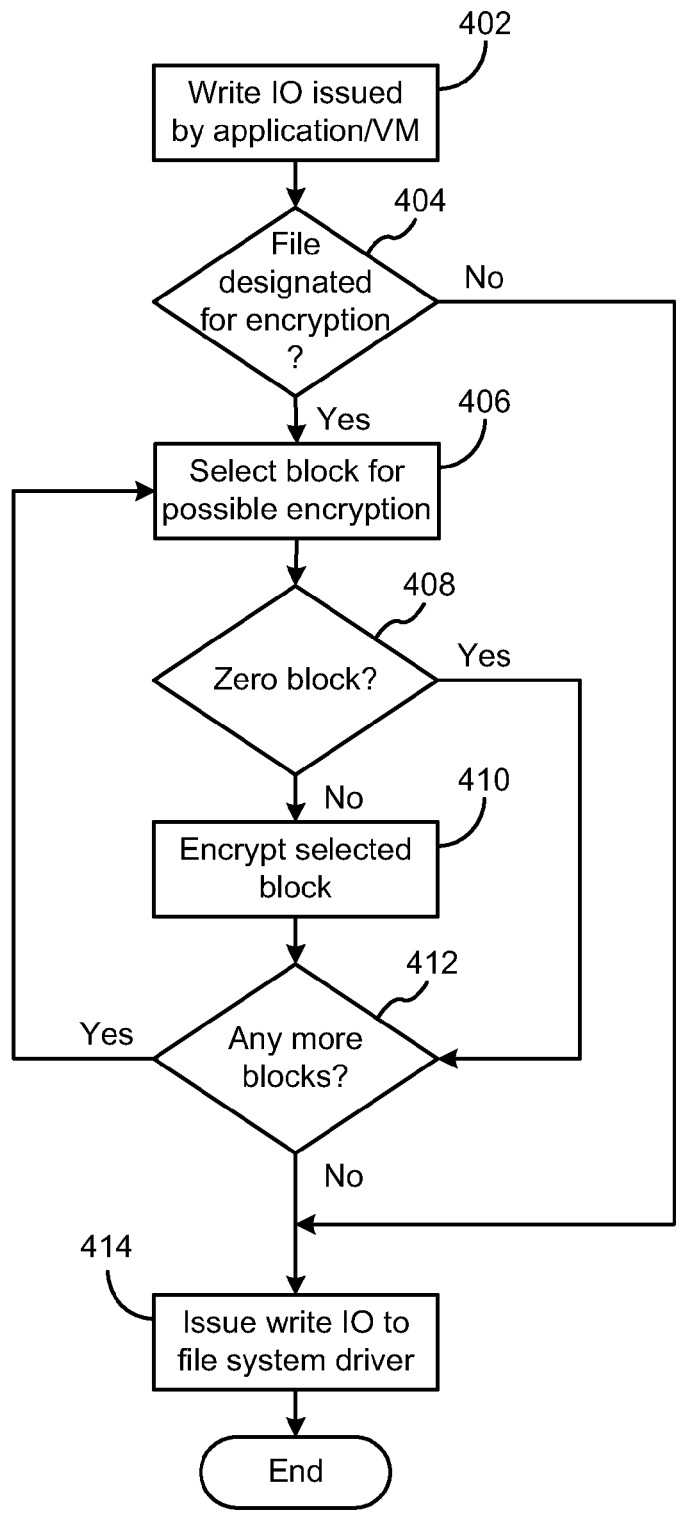
FIG. 4 is a flow diagram that illustrates a method of encrypting file blocks in response to a write IO.

FIG. 4 is a flow diagram that illustrates a method of encrypting file blocks in response to a write IO. This method is applicable to a write IO issued by an application in host computer system 100 or a VM in host computer system 200. The method begins at step 402 when the filter driver (filter driver 132 or 232) detects a write IO issued by an application (which may be application 112 or VM 212). At step 404, the filter driver examines the encrypted files table (encrypted files table 142 or 242) to determine if the file targeted by the write IO is an encrypted file, i.e., identified in the table. If the file targeted by the write IO is not an encrypted file, the method proceeds to step 414, where the write IO is issued to the file system driver (file system driver 133 or 233).

On the other hand, if the file targeted by the write IO is an encrypted file, the filter driver selects a block for possible encryption at step 406. If the selected block is a non-zero block as determined at step 408, the filter driver transmits the block to the encryption module (encryption module 141 or 241) for encryption by the encryption module at step 410. If the selected block is a zero block as determined at step 408, the block encryption step is skipped. At step 412, the filter driver determines if there are any more blocks of the file. If there is no more, the method proceeds to step 414. If there is more, the method returns to step 406. In this manner, all non-zero blocks of an encrypted file are encrypted at step 410 and none of the zero blocks of the encrypted file are encrypted at step 410. As a result, zero blocks are not unnecessarily encrypted according to embodiments. In addition, it should be recognized that this optimization is achieved by the filter driver that is external to the file system driver and without relying on any file allocation bitmaps maintained by the file system driver.

In some embodiments, a variant of FIG. 4 is used in which both zero and non-zero blocks are encrypted. Thus, the decision block at step 408 will not be executed and step 410 will be executed right after step 406. In such embodiments, a zero block will be encrypted into non-zero cyphertext and the optimizations described herein will apply only to reading of unallocated blocks in sparse files which are returned as zero blocks.

Figure 5:
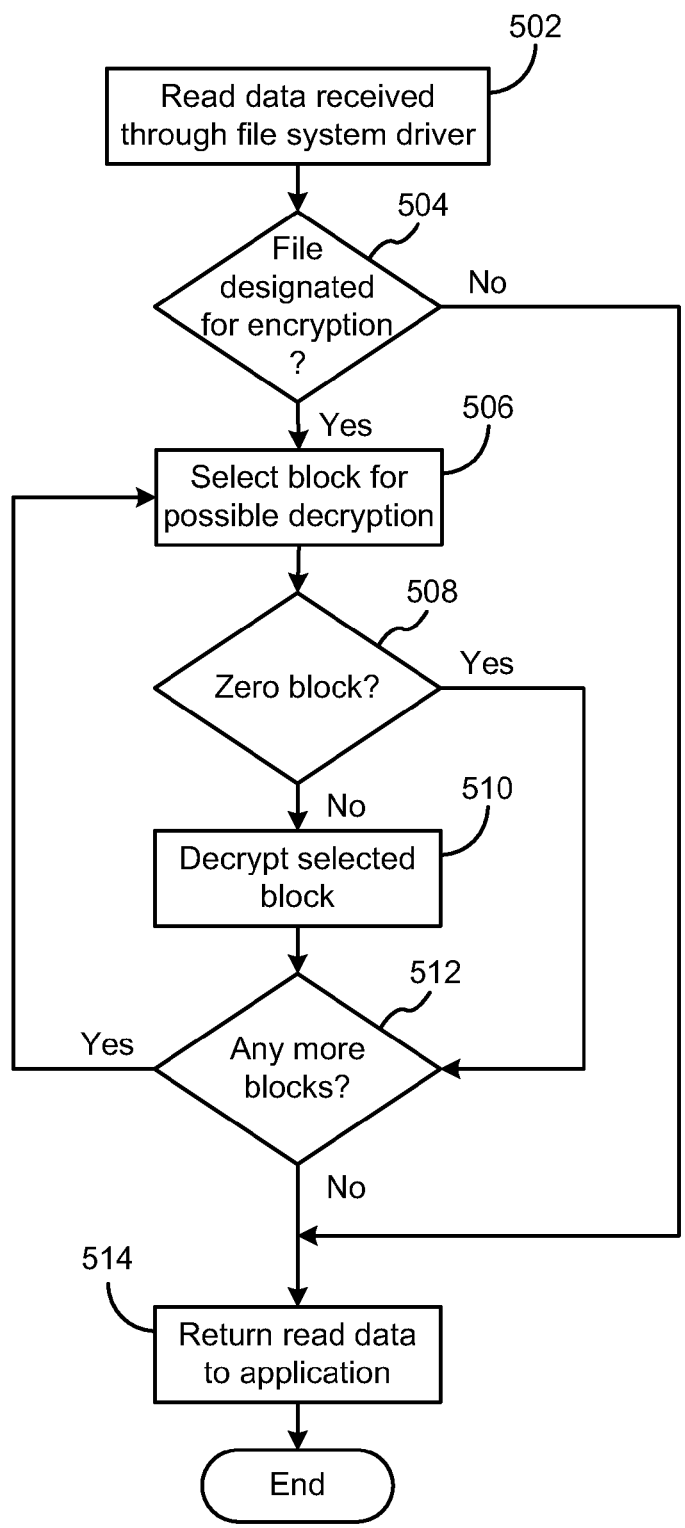
FIG. 5 is a flow diagram that illustrates a method of decrypting file blocks in response to a read IO.

FIG. 5 is a flow diagram that illustrates a method of decrypting file blocks in response to a read IO. This method is applicable to read IOs generated in host computer system 100 or host computer system 200. The method begins at step 502 when the filter driver (filter driver 132 or 232) detects a read IO issued by an application (which may be application 112 or VM 212). At step 504, the filter driver examines the encrypted files table (encrypted files table 142 or 242) to determine if the file targeted by the read IO is an encrypted file, i.e., identified in the table. If the file targeted by the read IO is not an encrypted file, the method proceeds to step 514, where the read data received through the file system driver (file system driver 133 or 233) are returned to the application.

On the other hand, if the file targeted by the read IO is an encrypted file, the filter driver selects a block of the encrypted file (in particular, the read data received through the file system driver) for possible decryption at step 506. If the selected block is a non-zero block as determined at step 508, the filter driver transmits the block to the encryption module (encryption module 141 or 241) for decryption by the encryption module at step 510. If the selected block is a zero block as determined at step 508, the block decryption step is skipped. At step 512, the filter driver determines if there are any more blocks of the encrypted file. If there is no more, the method proceeds to step 514. If there is more, the method returns to step 506. In this manner, all non-zero blocks of an encrypted file are decrypted at step 510 and none of the zero blocks of the encrypted file are decrypted at step 510. As a result, zero blocks are not unnecessarily decrypted according to embodiments. In addition, it should be recognized that this optimization is achieved by the filter driver that is external to the file system driver and without relying on any file allocation bitmaps maintained by the file system driver.

Figure 6:
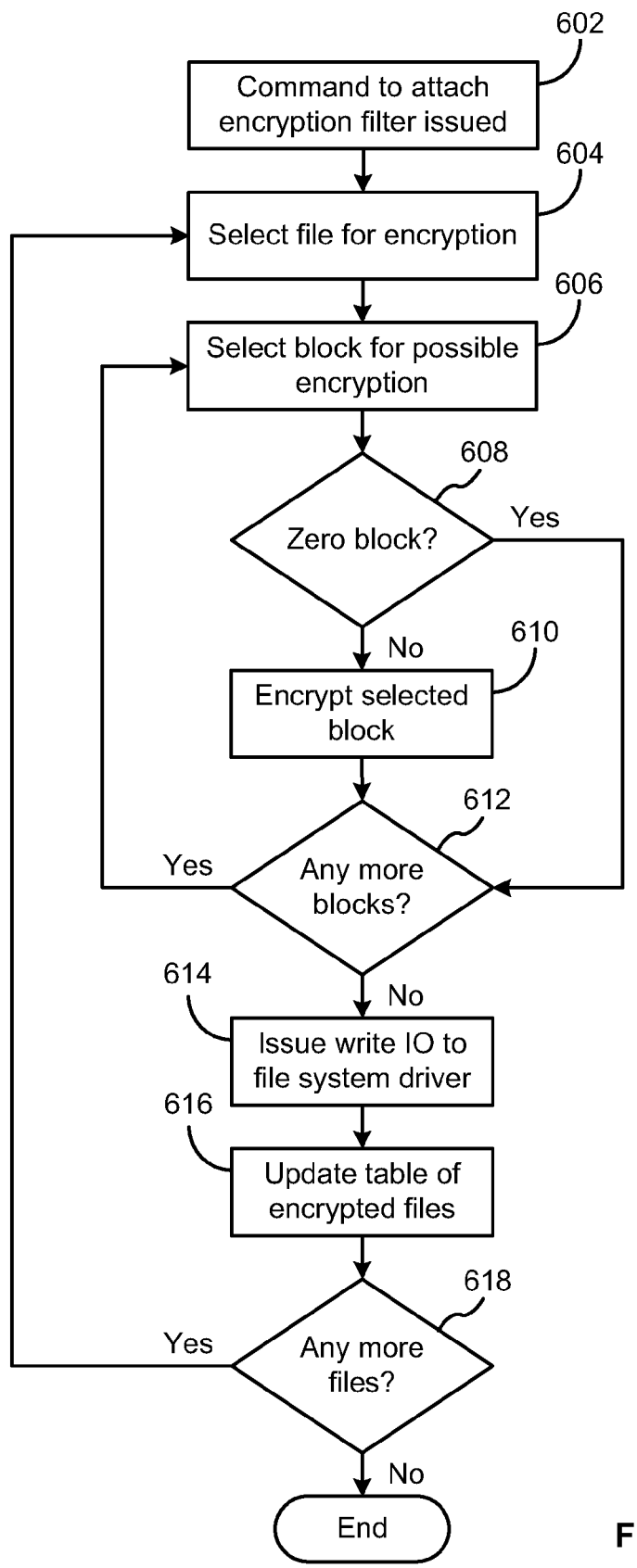
FIG. 6 is a flow diagram that illustrates a method of attaching an encryption filter to files of a file system.

FIG. 6 is a flow diagram that illustrates a method of attaching an encryption filter to files of a file system. This method may be carried out in either host computer system 100 or host computer system 200. The method begins at step 602 when the filter driver (filter driver 132 or 232) receives a command to attach an encryption filter to one or more files.

At step 604, the filter driver selects one of the files for encryption. Then, at step 606, the filter driver selects a block for possible encryption. If the selected block is a non-zero block as determined at step 608, the filter driver transmits the block to the encryption module (encryption module 141 or 241) for encryption by the encryption module at step 610. If the selected block is a zero block as determined at step 608, the block encryption step is skipped. At step 612, the filter driver determines if there are any more blocks of the file. If there is no more, the method proceeds to step 614. If there is more, the method returns to step 606, where another block is selected for possible encryption.

At step 614, the filter driver issues a write IO to the file system driver (file system driver 133 or 233) to write the blocks of the file to storage. For non-sparse files, both encrypted non-zero blocks and zero blocks would be written to storage. For sparse files, only the encrypted non-zero blocks would be written to storage. Then, at step 616, the filter driver adds the file identifier of the file to the encrypted files table (encrypted files table 142 or 242). If the filter driver determines at step 618 that there is no more file designated in the command received at step 602, the method ends. If there is more, the method returns to step 604, where the filter driver selects another file for encryption.

In some embodiments, a variant of FIG. 6 is used for sparse files in which zero blocks are also encrypted so long as the zero blocks are allocated. Thus, the decision block at step 608 will not be executed for allocated zero blocks and step 610 will be executed right after step 606. In such embodiments, a zero block will be encrypted into non-zero cyphertext and the optimizations described herein will apply only to reading of unallocated blocks in sparse files which are returned as zero blocks.

Figure 7:
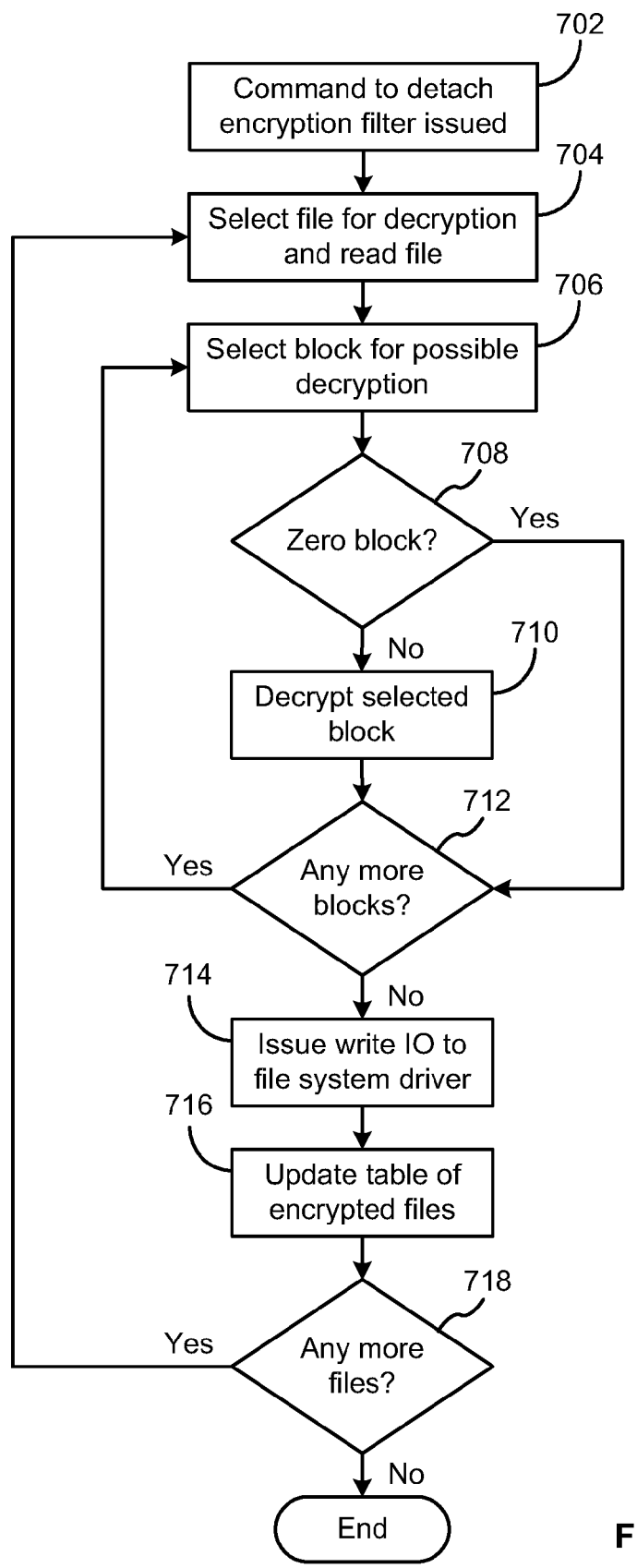
FIG. 7 is a flow diagram that illustrates a method of detaching an encryption filter from files of a file system.

FIG. 7 is a flow diagram that illustrates a method of detaching an encryption filter from files of a file system. This method may be carried out in either host computer system 100 or host computer system 200. The method begins at step 702 when the filter driver (filter driver 132 or 232) receives a command to detach an encryption filter from one or more files.

At step 704, the filter driver selects one of the files for decryption. Then, at step 706, the filter driver selects a block for possible decryption. If the selected block is a non-zero block as determined at step 708, the filter driver transmits the block to the encryption module (encryption module 141 or 241) for decryption by the encryption module at step 710. If the selected block is a zero block as determined at step 708, the block decryption step is skipped. At step 712, the filter driver determines if there are any more blocks of the file. If there is no more, the method proceeds to step 714. If there is more, the method returns to step 706, where another block is selected for possible decryption.

At step 714, the filter driver issues a write IO to the file system driver (file system driver 133 or 233) to write the blocks of the file to storage. For non-sparse files, both decrypted non-zero blocks and zero blocks would be written to storage. For sparse files, only the decrypted non-zero blocks would be written to storage. Then, at step 716, the filter driver removes the file identifier of the file from the encrypted files table (encrypted files table 142 or 242). If the filter driver determines at step 718 that there is no more file designated in the command received at step 702, the method ends. If there is more, the method returns to step 704, where the filter driver selects another file for decryption.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A non-transitory computer readable medium comprising instructions that are executed in a computer system to carry out a method of encrypting write data and decrypting read data in an input-output (IO) path between an application and a file system driver, said method comprising:
    receiving a write IO operation from the application;
    reading contents of a first file block targeted by the write IO operation;
    determining whether or not the first file block contains all zeroes;
    if the first file block does not contain all zeroes, encrypting the first file block and issuing the write IO operation with the first file block in encrypted form to the file system driver, and if the first file block contains all zeroes, bypassing the encryption and issuing the write IO operation with the first file block in unencrypted form to the file system driver;
    receiving a read IO operation from the application;
    reading contents of a second file block targeted by the read IO operation;
    determining whether or not the second file block contains all zeroes; and
    if the second file block does not contain all zeroes, decrypting the second file block and returning the decrypted contents of the second file block as read data, and if the second file block contains all zeroes, bypassing the decryption and returning zeroes as the read data.

2. The non-transitory computer readable medium of claim 1, wherein the write IO operation is issued by a virtual machine and the first file block is a file block of a virtual disk file for the virtual machine.

3. The non-transitory computer readable medium of claim 2, wherein the virtual disk file is a sparse file.

4. The non-transitory computer readable medium of claim 3, wherein the file system driver maintains a file allocation map for the sparse file and said determining is performed without access to the file allocation map.

5. The non-transitory computer readable medium of claim 1, wherein the first file block is a file block of a non-sparse file.

6. The non-transitory computer readable medium of claim 1, wherein the first file block has a size of at least 512 bytes.

7. The non-transitory computer readable medium of claim 1, wherein the read IO operation is issued by a virtual machine and the second file block is a file block of a virtual disk file for the virtual machine.

8. The non-transitory computer readable medium of claim 7, wherein the virtual disk file is a sparse file.

9. The non-transitory computer readable medium of claim 8, wherein the file system driver maintains a file allocation map for the sparse file and said determining is performed without access to the file allocation map.

10. The non-transitory computer readable medium of claim 1, wherein the second file block is a file block of a non-sparse file.

11. The non-transitory computer readable medium of claim 1, wherein the second file block has a size of at least 512 bytes.

12. A computer system comprising:
a storage device configured with a file system in which encrypted files are stored;
a host computing device having an interface to the storage device and configured with a filter driver that intercepts data of read and write commands for an encrypted file, a file system driver that executes read and write commands, and an encryption module that encrypts blocks of write data transmitted thereto and decrypts blocks of read data transmitted thereto,
wherein the filter driver, upon intercepting first data blocks of a read command for an encrypted file, transmits non-zero first data blocks to the encryption module for decryption therein but does not transmit zero first data blocks to the encryption module for decryption therein, and
wherein the filter driver, upon intercepting second data blocks of a write command for an encrypted file, transmits non-zero second data blocks to the encryption module for encryption therein but does not transmit zero second data blocks to the encryption module for encryption therein.

13. The computer system of claim 12, wherein
in response to a command to attach the encryption filter to a file, the filter driver transmits non-zero blocks of the file to the encryption module for encryption processing therein but does not transmit zero blocks of the file to the encryption module for encryption processing therein, and issues a write command to the file system driver to write the encrypted non-zero blocks of the file and the zero blocks of the file to the file system driver.

14. The computer system of claim 13, wherein the filter driver adds an identifier of the file to a tracking data structure that identifies all files to which the encryption filter has been attached.

15. The computer system of claim 12, wherein
in response to a command to detach the encryption filter from a file, the filter driver transmits non-zero blocks of the file to the encryption module for decryption processing therein but does not transmit zero blocks of the file to the encryption module for decryption processing therein, and issues a write command to the file system driver to write the decrypted non-zero blocks of the file and the zero blocks of the file to the file system driver.

16. The computer system of claim 15, wherein the filter driver removes an identifier of the file from a tracking data structure that identifies all files to which the encryption filter has been attached.

* * * * *